United States Patent
Kim et al.

(10) Patent No.: US 6,208,860 B1
(45) Date of Patent: Mar. 27, 2001

(54) HARD HAND-OFF TIMING DETERMINING METHOD THROUGH SOFTWARE

(75) Inventors: Yong Sin Kim; Dong Myoung Kim, both of Kyoungki-do (KR)

(73) Assignee: Hyundai Electronics Industries Co., Ltd. (KR)

( * ) Notice: Subject to any disclaimer, the term of this patent is extended or adjusted under 35 U.S.C. 154(b) by 0 days.

(21) Appl. No.: 09/213,196

(22) Filed: Dec. 17, 1998

(30) Foreign Application Priority Data

Dec. 20, 1997 (KR) ................................. 97-71178

(51) Int. Cl.$^7$ ..................................................... H04Q 7/20
(52) U.S. Cl. .......................... 455/440; 455/436; 370/332
(58) Field of Search .................................. 455/436, 440, 455/441, 442, 437, 525; 370/331, 332

(56) References Cited

U.S. PATENT DOCUMENTS

| | | | |
|---|---|---|---|
| 5,235,633 | * | 8/1993 | Dennison et al. .................... 455/440 |
| 5,649,000 | * | 7/1997 | Lee et al. ............................. 455/436 |
| 5,893,033 | * | 4/1999 | Keskitalo et al. .................... 455/440 |
| 6,011,971 | * | 1/2000 | Jolma .................................... 455/440 |
| 6,052,598 | * | 4/2000 | Rudrapatna et al. ................. 455/441 |
| 6,061,337 | * | 5/2000 | Light et al. ........................... 455/440 |
| 6,108,539 | * | 8/2000 | Ray et al. ............................. 455/430 |

* cited by examiner

*Primary Examiner*—Reinhard Eisenzopf
*Assistant Examiner*—Eliseo Ramos-Feliciano
(74) *Attorney, Agent, or Firm*—Saliwanchik, Lloyd & Saliwanchik

(57) ABSTRACT

An inter-cell hard hand-off timing determining method performs inter-cell hard hand-off by clearly determining a hand-off timing with a software method without assistance of hardware, thereby smoothly enabling traffic in a small base station that is installed in a shadow region or low traffic regions and reducing undesirable addition for hardware in increasing the small base station. The method is performed by the following steps of: identifying whether a mobile station has moved to a small base station; when it is determined that the mobile station has moved to the small base station, asking a selector and vocoder processing execution to report a power measurement report message having pilot signal strengths of an active set; reporting the PMRM to a call control execution; and when the mobile station is positioned at a boundary of a general base station, performing a inter-cell hard hand-off.

9 Claims, 3 Drawing Sheets

HARD HAND-OFF TIMING DETERMINING METHOD THROUGH SOFTWARE

FIELD OF THE INVENTION

This invention relates to a hard hand-off timing determining method through software in a Code Division Multiple Access System (CDMA), and more particularly, to an inter-cell hard hand-off timing determining method to perform inter-cell hard hand-off by clearly determining hand-off timing with a software method without assistance of a hardware.

BACKGROUND OF THE INVENTION

The process of transferring cellular-based calls from one cell cite to another as the mobile or portable moves through the service area is known as a "hand-off." There are two forms of hand-off: hard and soft. A hard hand-off requires the connection to be broken in the original cell before it is made in the successor cell. In general, in a CDMA communication system, a hard hand-off occurs when different frequency bands are allocated between neighboring base stations (i.e., adjacent cells). A base station transmits a hand-off message to a mobile station to allocate a new frequency band. Then the mobile station terminates transmission of the original base station and tunes itself to the new frequency of the successor base station. Once the mobile station has sequentially received two good frames from the successor base station, it starts transmission thereto, so that a hard hand-off can be performed from one cell to the other cell. The hard hand-off methods in the prior art are mainly performed utilizing hardware assistance. For example, if one mobile station has been communicating with base station "A" at a predetermined frequency band and nears another base station "B", there are two approaches to hand-off between base stations "A" and "B". In the first approach, base station "B" uses the pilot signal strengths of the same frequency band as the base station "A". In the second approach, base station "B" uses another frequency band, different from the predetermined frequency band, by determining with a software program the necessary information when the mobile station becomes closer to base station "B".

Also, because inter-cell hand-off timing through the prior art software program is not exact, the hand-off is performed at a common frequency band at the center of a cell not at the boundary of the cell. Accordingly, in the overall CDMA system of the prior art, calls are concentrated in the common frequency band. Therefore, in the digital mobile communication utilizing CDMA a problem exists in the hand-off by such software program.

U.S. Pat. No. 5,649,000 discloses a method and apparatus for providing a CDMA-to-CDMA different frequency hand-off in a CDMA cellular telephone system. A cellular system transfers a call from a source base station to the target base station. A mobile unit measures the strength of pilot signals emanating from surrounding base station. In response to the result of the measurement, a different frequency hand-off operation is initiated by the mobile unit when all pilot signals are lower than a threshold or is initiated by a system controller with consideration being given to the frequency band occupation state of surrounding base stations and the strength information reported from the mobile unit. This patent, however, has a problem in that it requires assistance of hardware such as a controller, a data positioning device and a frequency synthesizer.

Conventionally, the general base station uses multiple frequency assignments (FA) such as frequency bands of 779 MHz, 738 MHz, 697 MHz etc., to communicate with the mobile station, but a small base station uses only one of the frequency bands, i.e., one FA, and cannot use a dummy pilot signal. Accordingly, if one mobile station which has been communicating with the general base station at a certain frequency band moves from the cell region of the general base station to the cell region of small base station that uses different frequency bands than the original frequency band, an abrupt cut in the call occurs because the hand-off cannot be performed. FIG. 1, shows a hand-off situation during which a mobile station (not shown) moves from a general base to a small base station. The solid line circles "A", "C" and "D" represent the general base station and the dotted line circle "B" represents the small base station. In this figure, assuming that the general base station "A" uses two FAs of 779 MHz and 738 MHz and the small base station "B" uses one FA of 779 MHz, if the mobile station has been communicating with base station "A" at 738 MHZ, the mobile station cannot communicate with base station "B" at the cell boundary of the base station "A" because the frequency cannot be set at 738 MHz when base station "B" is using 779 MHz.

BRIEF SUMMARY OF THE INVENTION

It is therefore one object of the present invention to provide an inter-cell hard hand-off timing determination method to perform an inter-cell hard hand-off by clearly determining hand-off timing purely with a software method without the assistance of hardware, thereby smoothly enabling traffic in the small base station that is installed in a shadow region or a low traffic region and reducing the need for the undesirable addition of hardware in the small base station.

In accordance with one aspect of the invention, there is provided an inter-cell hard hand-off timing determining method characterized by the steps of: identifying whether a mobile station moves from the cell region of a general base station to the cell region of a small base station through a call control execution (CCOX) in a base station controller; if YES in the identifying step, asking, at the CCOX, a selector and vocoder processing execution (SVPX) in the controller to report a power measurement report message (PMRM) that has pilot signal strengths of an active set to the CCOX; reporting, at the SVPX, the PMRM to the CCOX at predetermined times; identifying, by the CCOX that received the PMRM, whether the mobile station is positioned at the boundary of the general base station; if YES in the identifying step, performing an inter-cell hand-off by the controller.

In accordance with another aspect of the invention, if the mean value of the pilot signal strengths of the PMRM reported at predetermined time N1 is lower than the maximum threshold or sequentially drops below the minimum threshold more than predetermined time N2, the CCOX identifies the value of a round trip delay (RTD) and determines that the mobile station is positioned at the boundary of the general base station if the RTD value is above a predetermined value N3.

In accordance with a further aspect of the invention, in the reporting steps, if the lowest one of the pilot signal strengths of the active set of the received PMRM is higher than the maximum threshold, the CCOX asks the SVPX to pause the reporting of the PMRM, and if the lowest one of the pilot signal strengths of the active set of the received PMRM is lower than the maximum threshold, the SVPX re-reports the PMRM to the CCOX.

BRIEF DESCRIPTION OF THE DRAWINGS

The invention disclosed herein will be understood better with reference to the following drawing of which.

DETAILED DISCLOSURE OF THE INVENTION

Hereinbelow, detailed embodiments of the present invention will be described in detail with reference to accompanying drawings.

Figure 1:
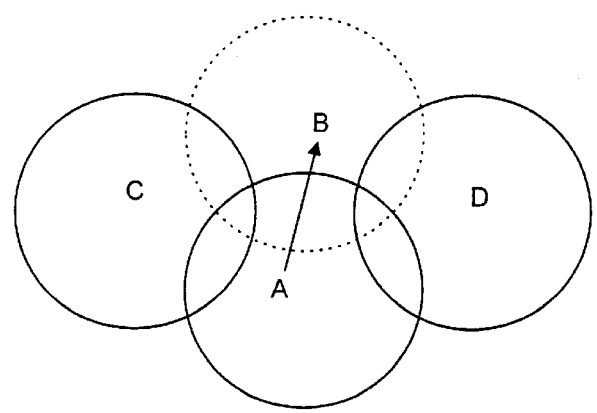
FIG. 1 is a view showing situation when a hand-off occurs as a mobile station moves from a general base station to a small base station.
Figure 2:
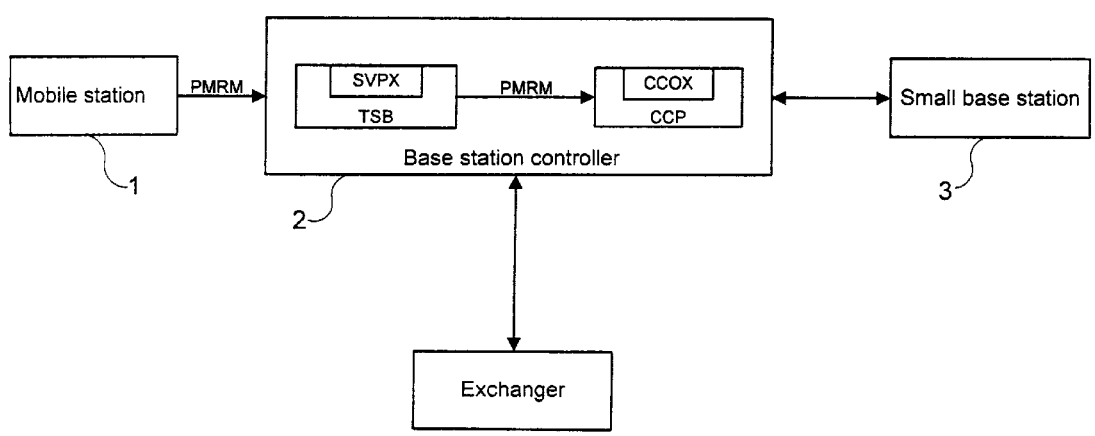
FIG. 2 is a block diagram realizing the method of the present invention.

Referring to FIG. 2, there is shown a block diagram for the CDMA system with relation to the method of the present invention. As shown in the drawing, the system comprises a mobile station 1, a base station controller 2, a small base station 3 and an exchanger 4.

In the base station controller 2, a transceiver selector bank (TSB) is a software block performing vocoding between the mobile station 1 and the exchanger 4, and a call control processor (CCP) is a software block performing call control such as sending, receiving and registering for a call. A selector and vocoder processing execution (SVPX) in the TSB is a software block performing the hand-off and a call control execution (CCOX) is a software block determining call processing and the hand-off.

Figure 3:
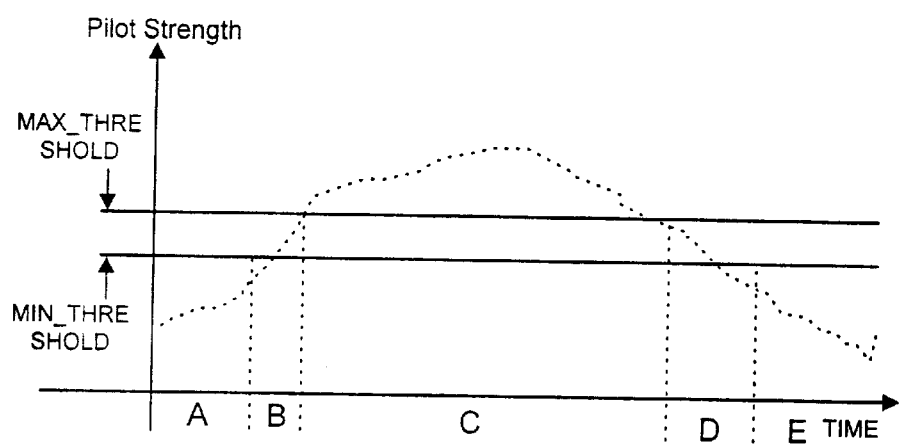
FIG. 3 is a view showing a variation on the time axis for pilot signal strengths including the PMRM received from the mobile station of FIG. 2.

FIG. 3 is a view showing a variation on the time axis for pilot strengths including the PMRM received from the mobile station in FIG. 2 for performing the method of the present invention. In the drawing, a maximum threshold and a minimum threshold are each values of the pilot signal strengths that are stored in the program load data (PLD) (not shown) of the CCOX in FIG. 2 to match with the field condition. At period A, the CCOX attempts the hand-off and the SVPX periodically reports the pilot signal strengths of the active set of the PMRM to the CCOX at period B. Then the CCOX determines whether or not to perform the hand-off based on the reported value. At period C, the SVPX pauses the reporting to the CCOX and re-starts the reporting at period D. Then the CCOX determines whether or not to perform the hand-off based on the reported value. In addition, at period E, where the pilot signal strength suddenly drops below the minimum threshold from period D, the CCOX attempts the hand-off.

Figure 4:
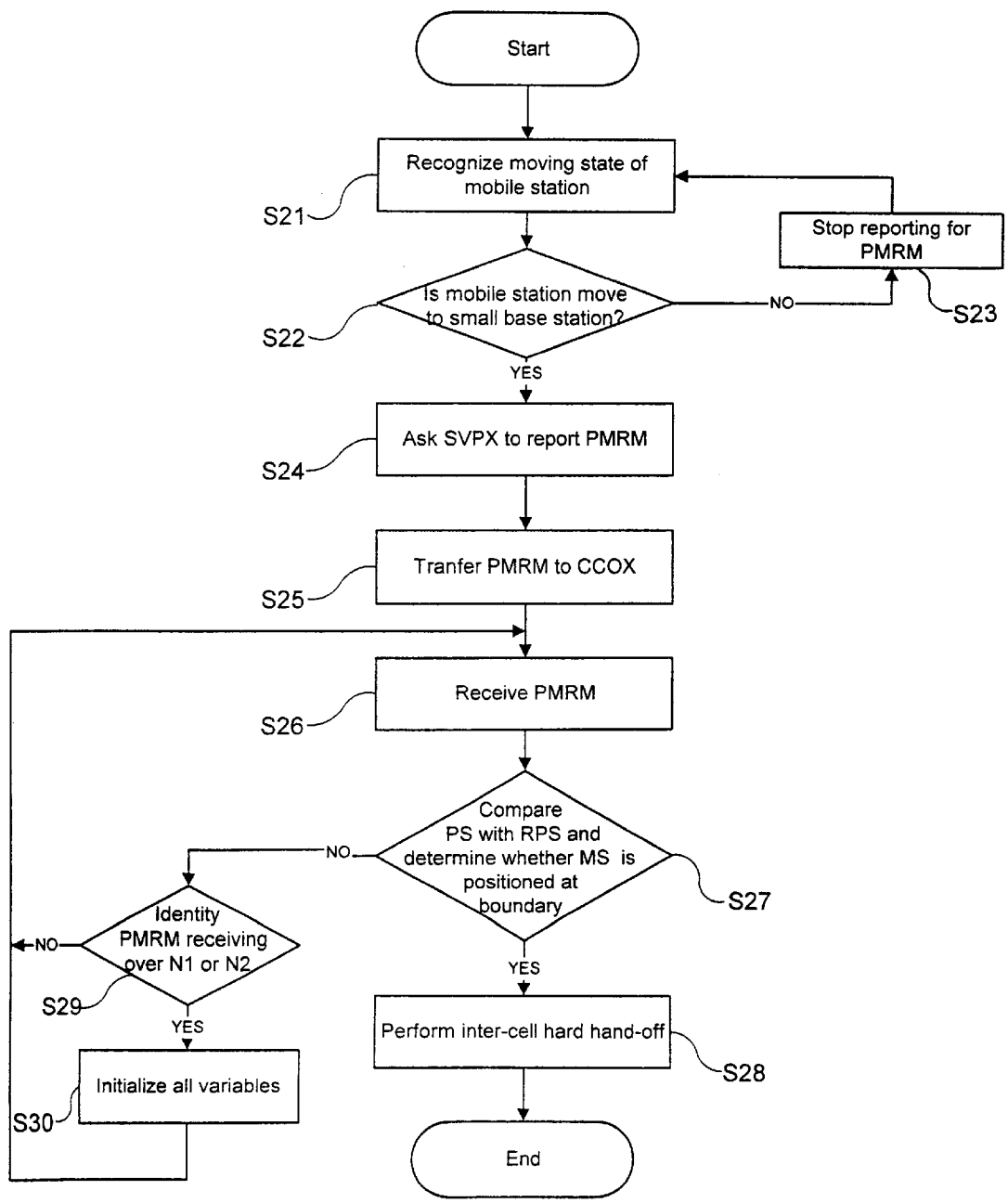
FIG. 4 is a flow chart for illustrating the method of the present invention.

Hereinbelow detailed description for the method of the present invention will be described with reference FIG. 4 which shows a flow chart for the present invention, of FIG. 2 and FIG. 3. With reference to FIG. 4, numerals S21 through S30 represent steps.

The base station controller 2 recognizes the moving state of the mobile station 1 by means of the CCOX (S21) and identifies whether the mobile station 1 has moved from a general base station (not shown) to the small base station 3 (S22). If YES in step 22, the CCOX asks the SVPX to report the PMRM which includes values for the pilot signal strengths of the active set periodically received from the mobile station 1 and the round trip delay (RTD) (S24). If NO in step 22, the CCOX orders the SVPX to stop the reporting for the PMRM(S23).

In step 22, the determination for whether the mobile station 2 moves to the small base station 3 is determined as follows: when the mobile station 1 communicates with the general base station, information for surrounding base stations in the six cells (not shown) that the mobile station 1 can cover are stored in the base station controller 2 in the form of neighbor data (the general base station being included in one of the cells). If it is determined that the base station controller 2 has small base stations above a predetermined number in the stored information, preferably at least three as the neighbor data thereof, it is determined that the mobile station 1 moves to the small base station.

In step 24, the SVPX that received the reporting request for the PMRM transfers the PMRM to the CCOX (S25), then the CCOX that received the PMRM (S26) compares the pilot signal strengths of the PMRM with the reference pilot signal strengths stored to the PLD in the CCOX and determines whether the mobile station 1 is positioned at the boundary of the general base station (S27). If YES in step S27, the CCOX performs the inter-cell hand-off based on the received pilot signal strengths (S28).

Also, in step 27, the CCOX identifies whether the mean value of the pilot signal strengths of the PMRM reported at a predetermined time N1 is lower than the maximum threshold stored in the PLD or has sequentially dropped below the minimum threshold stored in the PLD more than a predetermined time N2. If any one of the two conditions is satisfied, the CCOX identifies the value of RTD stored in the PLD and determines that the mobile station 1 is positioned at the boundary of the general base station if the RTD value is above a predetermined value N3. The further away the mobile station 1 is from the general base station, the larger the value becomes. The closer the mobile station 1 is to the general base station, the smaller the value becomes.

The predetermined times N1, N2 and N3 are values stored in the PLD of the CCOX and are set according to the status of the field under the judgement of the operator with consideration as to the ease or difficulty for the condition of hand-off.

In performing the hand-off, although the one of former conditions is satisfied, if the RTD value is lower than the stored RTD value, the CCOX does not perform the hand-off in order to prevent a hand-off at the center of a cell.

Also, in step 27, if it is determined that the mobile station 1 is not positioned at the boundary the general base station, the base station controller 2 begins counting at the PMRM from the SVPX and identifies whether the received time has reached the predetermined time (N1 or N2) (S29). If the received time did not reach the predetermined times (N1 or N2), flow returns to step 26 in which the CCOX re-receives the PMRM. If it is determined that the mobile station 1 is not positioned at the boundary of the general base station in spite of receiving the PMRM for the predetermined times (N1 of N2), operator initializes all the variables (S30), and flow returns to step 26, in which the CCOX re-receives the PMRM.

In step 27, if the lowest one of pilot signal strengths to have been presently received from the mobile station 1 is larger than the maximum threshold, the CCOX asks the SVPX to pause the reporting for the PMRM. In general, the base station controller 2 can receive six pilot signal strengths as the maximum since the mobile station 1 covers six cells. The SVPX pauses the reporting for the PMRM to the CCOX. At the paused state, if it is determined that the lowest pilot signal strength becomes smaller than the maximum threshold, the SVPX re-reports the PMRM to the CCOX.

For the re-reporting step, if it is determined that the mobile station 1 has moved toward another direction away from the small base station 3 based on the neighbor data of the base station controller 2, the SVPX stops the reporting for the PMRM to the CCOX and does not perform the hand-off operation.

As described hereinabove, according to the present invention it is possible to smoothly enable traffic in the small base station that is installed in a shadow region or low traffic regions and to reduce undesirable addition of hardware in increasing small base station and thereby to save the cost due to undesirable addition for hardware.

Hereinabove although the present invention is described with regard to the small base station, the present invention may be adaptable to the general base station.

It is further understood by those skilled in the art that the foregoing description is a preferred embodiment of the disclosed method and that various changes and modifications may be made in the invention without departing from the spirit and scope thereof.

What is claimed is:

1. An inter-cell hard hand-off timing determining method characterized by the steps of: identifying whether a mobile station moves from the cell region of a general base station to the cell region of a small base station through a call control execution (CCOX) in a base station controller; if YES in the identifying step, asking, at the CCOX, a selector and vocoder processing execution (SVPX) in the controller to report a power measurement report message (PMRM) that has pilot signal strengths of an active set to the CCOX; reporting, at the SVPX, the PMRM to the CCOX at predetermined times; identifying, by the CCOX that received the PMRM, whether the mobile station is positioned at the boundary of the general base station; if YES in the identifying step, performing an inter-cell hand-off by the controller.

2. An inter-cell hard hand-off timing determining method according to claim 1, in which if the base station controller has a small base station above a predetermined number as the neighbor data thereof for neighboring base station, it is determined that the mobile station moves to the small base station.

3. An inter-cell hard hand-off timing determining method according to claim 1, in which if the mean value of the pilot signal strengths of the PMRM reported at a predetermined time N1 is lower than the maximum threshold or sequentially drops below the minimum threshold more than a predetermined times N2, the CCOX identifies the value of a round trip delay (RTD) and determines that the mobile station is positioned at the boundary of the general base station if the RTD value is above predetermined time N3.

4. An inter-cell hard hand-off timing determining method according to claim 3, in which the maximum threshold, the minimum threshold, the RTD and the predetermined times N1, N2 and N3 are the values stored in the program load data (PLD) of the CCOX and set according to the status of the field under the judgement of an operator.

5. An inter-cell hard hand-off timing determining method according to claim 1, further wherein in the reporting steps, if the lowest one of the pilot signal strengths of the active set of the received PMRM is higher than the maximum threshold, the CCOX asks the SVPX to pause the reporting of the PMRM.

6. An inter-cell hard hand-off timing determining method according to claim 1, further wherein in the reporting step, if the lowest one of the pilot signal strengths of the active set of the received PMRM is lower than the maximum threshold, the SVPX re-reports the PMRM to the CCOX.

7. An inter-cell hard hand-off timing determining method according to claim 6, in which if the mean value of pilot signal strengths of the PMRM reported at a predetermined time N1 is lower than the maximum threshold or sequentially drops below the minimum threshold more than a predetermined times N2, the CCOX identifies the value of a RTD and determines that the mobile station is positioned at the boundary of the general base station if the RTD value is above a predetermined time N3.

8. An inter-cell hard hand-off timing determining method according to claim 7, in which the maximum threshold, the minimum threshold, the RTD and the predetermined times N1, N2, and N3 are the values stored in the PLD of the CCOX and set according to the status of the field under the judgement of an operator.

9. An inter-cell hard hand-off timing determining method according to claim 1, in which for the reporting step, if it is determined that the mobile station has moved toward another directions away from the small base station, the SVPX stops the reporting for the PMRM to the CCOX and does not perform the hand-off operation.

* * * * *